United States Patent
Zhu et al.

(10) Patent No.: US 8,959,409 B2
(45) Date of Patent: Feb. 17, 2015

(54) DETECTION AND RECOVERY OF HARQ NAK-TO-ACK FEEDBACK ERROR IN WIRELESS COMMUNICATIONS SYSTEMS

(75) Inventors: Yuan Zhu, Beijing (CN); Xiangying Yang, Portland, OR (US); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1313 days.

(21) Appl. No.: 12/317,351

(22) Filed: Dec. 22, 2008

(65) Prior Publication Data

US 2010/0005354 A1 Jan. 7, 2010

Related U.S. Application Data

(60) Provisional application No. 61/134,188, filed on Jul. 7, 2008.

(51) Int. Cl.
- *H04L 1/18* (2006.01)
- *G08C 25/02* (2006.01)
- *H04W 52/02* (2009.01)
- *H04L 1/14* (2006.01)

(52) U.S. Cl.
CPC ......... *H04W 52/0248* (2013.01); *H04L 1/1864* (2013.01); *H04L 1/14* (2013.01); *H04L 1/1896* (2013.01); *H04L 1/1825* (2013.01); *H04W 52/0229* (2013.01); *H04L 1/1812* (2013.01); *H04L 1/1887* (2013.01); *Y02B 60/50* (2013.01)
USPC .......................................... 714/748

(58) Field of Classification Search
CPC ... H04L 1/1864; H04L 1/1812; H04L 1/1825; H04L 1/1896; H04L 1/14
USPC ........................................... 714/748
See application file for complete search history.

(56) References Cited

U.S. PATENT DOCUMENTS

| | | | | |
|---|---|---|---|---|
| 3,754,211 | A * | 8/1973 | Rocher et al. | 714/749 |
| 6,775,267 | B1 * | 8/2004 | Kung et al. | 370/352 |
| 6,987,780 | B2 * | 1/2006 | Wei et al. | 370/469 |
| 7,366,122 | B2 * | 4/2008 | Lee et al. | 370/310.1 |
| 7,502,385 | B2 * | 3/2009 | Wei et al. | 370/469 |
| 7,693,125 | B2 * | 4/2010 | Ihm et al. | 370/343 |
| 7,733,840 | B2 * | 6/2010 | Ihm et al. | 370/343 |
| 7,890,049 | B2 * | 2/2011 | Chang et al. | 455/11.1 |
| 7,916,719 | B2 * | 3/2011 | Roh et al. | 370/363 |
| 8,060,801 | B2 * | 11/2011 | Seol et al. | 714/748 |
| 8,089,940 | B2 * | 1/2012 | Rezaiifar et al. | 370/335 |
| 2003/0067907 | A1 * | 4/2003 | Rezaiifar et al. | 370/349 |
| 2004/0109433 | A1 * | 6/2004 | Khan | 370/345 |
| 2004/0174846 | A1 * | 9/2004 | Kwon et al. | 370/328 |
| 2007/0070955 | A1 * | 3/2007 | Seol | 370/335 |
| 2008/0065944 | A1 * | 3/2008 | Seol et al. | 714/748 |
| 2008/0101285 | A1 | 5/2008 | Venkatachalam et al. | |
| 2008/0209301 | A1 * | 8/2008 | Chang et al. | 714/749 |

(Continued)

*Primary Examiner* — Joseph D Torres
(74) *Attorney, Agent, or Firm* — Schwabe, Williamson & Wyatt, P.C.

(57) ABSTRACT

In wireless communication networks that use ARQ/HARQ feedback protocols, when a first device receives an apparent HARQ ACK from a second device, the first device may make a new transmission using a HARQ Channel ID whose previous usage was under conditions indicating a likelihood of error in the ACK. When the second device receives the new transmission, the reuse of that HARQ Channel ID in a new transmission rather than a retransmission lets the second device know that its previous NAK transmission was incorrectly received as an ACK.

13 Claims, 7 Drawing Sheets

(56) References Cited

U.S. PATENT DOCUMENTS

2008/0240014 A1* 10/2008 Chang et al. .................. 370/315
2008/0273454 A1* 11/2008 Malkamaki et al. .......... 370/216
2009/0003257 A1* 1/2009 Kumar et al. ................. 370/314
2009/0086657 A1* 4/2009 Alpert et al. .................. 370/310

* cited by examiner

DETECTION AND RECOVERY OF HARQ NAK-TO-ACK FEEDBACK ERROR IN WIRELESS COMMUNICATIONS SYSTEMS

CROSS-REFERENCE TO RELATED APPLICATIONS

This application is related to U.S. provisional patent application Ser. No. 61/134,188, filed Jul. 7, 2008, titled Techniques and Improvements for Broadband Wireless Networks, and claims priority to that filing date for all applicable subject matter.

BACKGROUND

Wireless communications networks following the protocols of the standard known as IEEE 802.16 may use various types of message tracking and may use multiple levels of acknowledgement in order to promote high traffic throughput and reliable communications in the networks. Hybrid Automatic Repeat Request (HARQ) protocols may be used at the PHY level for fast response, while Automatic Repeat Request (ARQ) protocols may be used at the MAC level when the HARQ protocols don't provide sufficient reliability. For message tracking, each transmission may contain a HARQ Channel ID (ACID) to track the message and its acknowledgement. The available ACID's for use between a base station and a particular subscriber station are limited in number and must be repeatedly recycled. A single-bit parameter called a HARQ Sequence Number (AI_SN) may be associated with each ACID to indicate whether the current transmission is a new transmission or a retransmission of a previously NAK'd transmission. A retransmission will contain the same ACID and same AI_SN as the original transmission that was NAK'd. A new transmission is indicated when the AI_SN has the opposite value that it had the last time the current ACID was used.

To handle acknowledgements, errors in a received transmission are initially detected and handled at the PHY layer using HARQ. If the transmission is received correctly, the receiving device may transmit a PHY-level ACK back to the originating device, which then removes that transmission from its PHY-level buffers. But if the transmission is received incorrectly, a PHY-level NAK is transmitted back, still following the HARQ protocol, and the originating device retransmits the data. If the PHY-level retransmissions also fail a certain number of times, this failure is then passed to the MAC layer of the receiving device, which initiates a MAC-level NAK using the ARQ protocol, so that the originating device can take more drastic action. MAC-level exchanges of this type are much more time-consuming, which hurts the efficiency of communications between the two devices. Unfortunately, HARQ ACKs and NAKs may be expressed by a single bit that is not protected by CRC or other error detection techniques, so the originating device may erroneously receive a HARQ NAK as a HARQ ACK without knowing of the error. It would then clear the associated transmission from its PHY-level buffer, thus losing any chance to retransmit the data until the receiver's MAC layer notifies the originating device of the missing data. At that point, recovering from the error is much more difficult and time-consuming.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
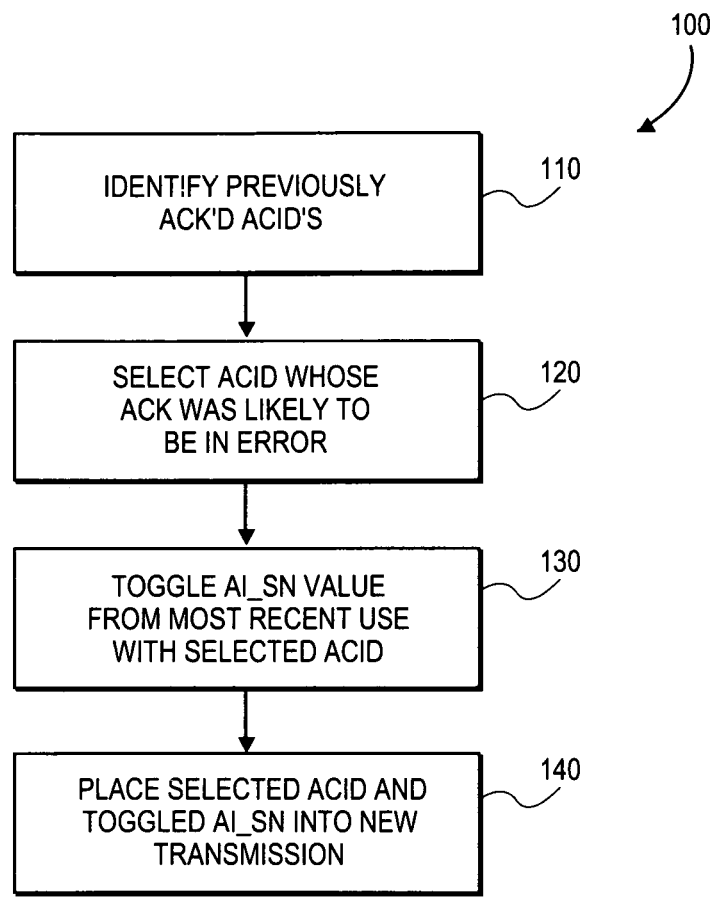
FIG. 1 shows a flow diagram of a method of choosing an ACID for a new transmission, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by one or more computers. For example, a computer-readable medium may include a tangible storage medium, such as but not limited to read only memory (ROM); random access memory (RAM); magnetic disk storage media; optical storage media; a flash memory device, etc. A computer-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "base station" (BS) is used to describe a wireless device that controls and/or coordinates wireless communications in a network, while the term "subscriber station" (SS) is used to describe one of the other devices in the network whose communications are controlled and/or coordinated by the base station. Different terms may be used by others to describe these functional devices, such as but not limited to the commonly used terms access point (AP), mobile station (MS), STA, etc., but the terms 'base station' and 'subscriber station' are considered broad enough to encompass these functional devices, regardless of their names.

When a first wireless device makes a new transmission (i.e., not a retransmission of a previously NAK'd transmission) to a second wireless device, the new transmission may include a previously-used ACID that was ACK'd by the second device in its last usage, along with a one-bit AI_SN that has been toggled from its previous value with that same ACID to indicate this is a new transmission. This is the normal way of recycling the limited number of available ACID's for a particular BS-SS pair, and distinguishing new transmissions from retransmissions. If the second device responds to a transmission with a NAK, it expects to receive a retransmission having the same ACID with the same AI_SN value as the original transmission. However, if the second device receives a transmission using the same ACID, but a toggled AI_SN, the second device knows that the first device is using this ACID in a new transmission, so the second device can assume that first device must have incorrectly received the earlier NAK as an ACK. To take advantage of this situation, some embodiments of the invention may select the ACID for the new transmission from the previously-ACK'd transmissions that were likely to have contained such an error. This makes it more likely that the error will be detected without having to wait until expiration of the time limit for retransmission of the data.

FIG. 1 shows a flow diagram of a method of choosing an ACID for a new transmission, according to an embodiment of the invention. For downlink sequences, this process may be performed by the BS, while for uplink sequences, this process may be performed by the SS. In flow diagram 100, at 110 the device performing this process may create a pool of available ACID's by eliminating any ACID's whose most recent transmission resulted in a NAK from the other device, thus reducing the group of available ACID's to those whose previous use was in a transmission that resulted in an ACK being received. From this reduced group, at 120 the device may select an ACID whose most recent transmission resulted in receiving an ACK under circumstances that make it more likely a NAK was incorrectly received as an ACK.

Several criteria may be used for this determination. For example, if the ACK was received with a low signal-to-noise ratio (SNR), that low SNR could indicate the likelihood of an incorrectly received signal. If the ACK was received with a weak signal, even if the noise was comparatively low, that weak signal could indicate the likelihood of an incorrectly received signal. Other criteria may also be used to determine the likelihood of an incorrectly received signal. In addition, still other criteria may also be used to select an ACID, so that the selected ACID may be likely, but not be the likeliest, of the available ACID's to have been associated with an incorrectly received ACK.

After selecting an ACID to use, at 130 the device may select an AI_SN value that is toggled (i.e., the opposite value) from the AI_SN value that was used with this same ACID in this ACID's previous use. This will identify the transmission as a new transmission. At 140, the selected ACID and the selected AI_SN may be placed into the new transmission.

Figure 2:
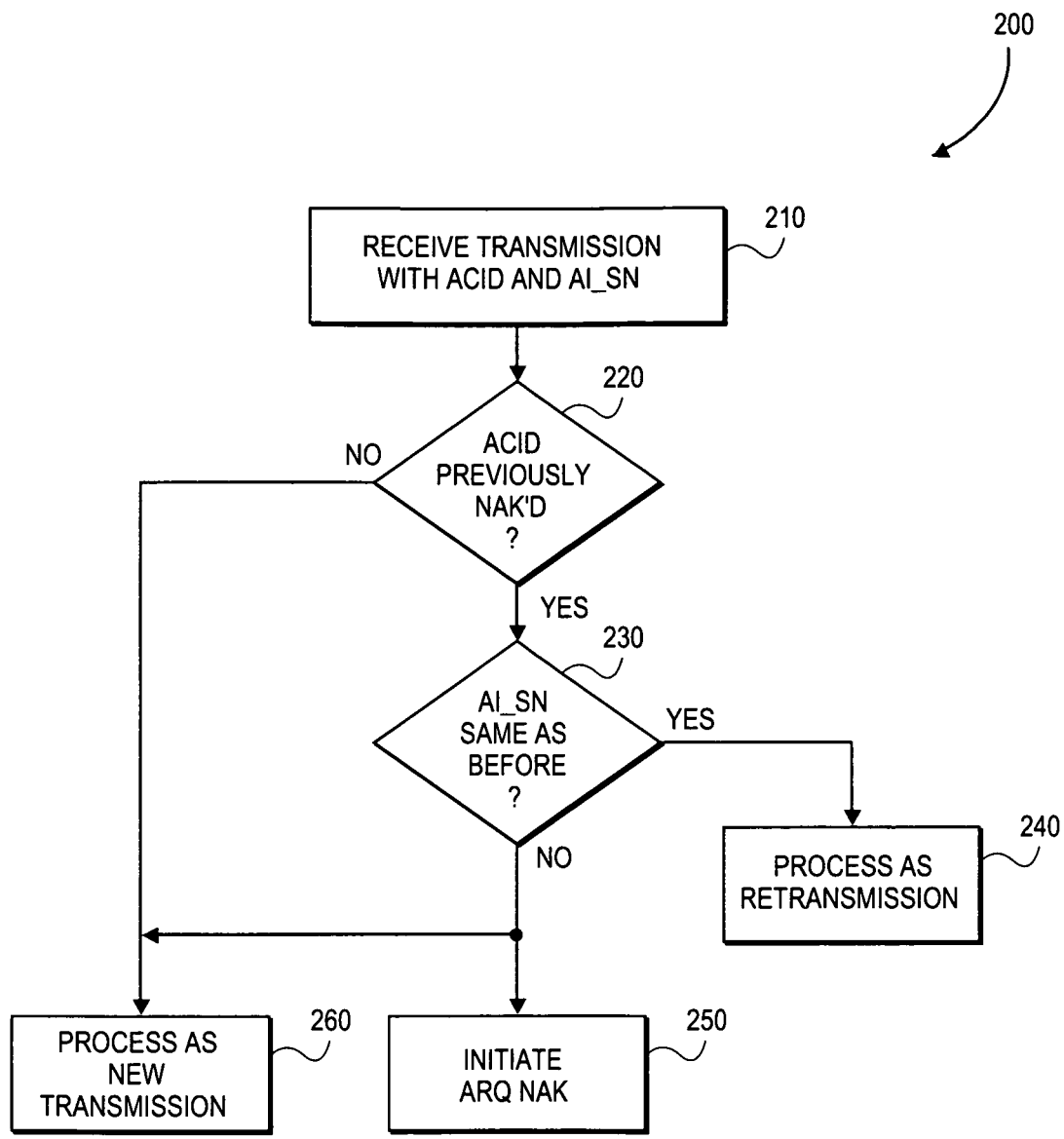
FIG. 2 shows a flow diagram of a method of determining that a previously transmitted NAK was received as an ACK by the other device, according to an embodiment of the invention.

FIG. 2 shows a flow diagram of a method of determining that a previously transmitted NAK was received as an ACK by the other device, according to an embodiment of the invention. For downlink sequences, this process may be performed by the SS, while for uplink sequences, this process may be performed by the BS. In flow diagram 200, at 210 the device may receive a transmission containing a particular ACID and a particular AI_SN. The device may then compare this ACID with the ACID that was contained in a previously received transmission that was NAK'd by this device, and for which a retransmission has not been received. If the ACID is not associated in this manner with a current NAK status, as indicated at 220, then the transmission may be processed at 260 in the normal manner as a new transmission.

However, if this ACID is associated with a current NAK status, as indicated at 220, then the AI_SN may be examined at 230 to determine if this transmission was intended to be retransmission. If the AI_SN in the currently-received transmission has the same value that it had with the previous transmission containing this ACID, then the current transmission was intended as a retransmission, and may be processed as such at 240. However, if the decision at 230 indicates that the AI_SN in the currently-received transmission has the opposite value that it had with the previous transmission containing this ACID, then the current transmission was intended as a new transmission. But since that previous transmission was NAK'd by this device, this particular ACID should only be used for a retransmission. This conflict may be interpreted by this device as an indication that its previous NAK was incorrectly received as an ACK. This determination may result, at 250, in this device initiating a NAK at its MAC level, using the ARQ protocol. Although such an ARQ NAK might eventually happen anyway (e.g., after a timeout expires without receiving the expected retransmission), the process described in FIG. 2 allows it happen much sooner.

Although an error in a previous communication may be indicated by the determinations at 220 and 230, the current transmission is still a valid new transmission. So in addition to initiating an ARQ NAK at 250, the device may also process the current transmission as a new transmission at 260. Note: in this document, all ACKs and NAKs are assumed to be handled at the PHY level using HARQ protocols, unless the MAC level or ARQ protocol is expressly indicated.

FIGS. 3, 4, 5 and 6 show different scenarios for detection of an incorrectly received ACK, according to various embodiments of the invention. In the downlink sequence of FIG. 3, the BS may make a transmission Tx1 to the SS. The SS does not receive Tx1 correctly, and therefore transmits a NAK back to the BS. However, due to poor signal quality or other reason the NAK is received by the BS as an ACK. Note: this exchange may have been preceded by one or more Tx1/NAK exchanges in which the NAK was correctly received by the BS, so Tx1 may have been a retransmission (assuming the maximum allowable number of retransmissions was not reached). However, this distinction does not change the pertinent exchanges that are illustrated here. While the SS is waiting for a retransmission of Tx1 (labeled as ReTx1), the BS may think that Tx1 was correctly received by the SS, and BS may therefore clear Tx1 from its PHY-level buffers. Since the BS believes that Tx1 was correctly received by the SS, the BS may place the ACID from Tx1 back into its pool of available ACID's to use for new transmissions.

Figure 3:
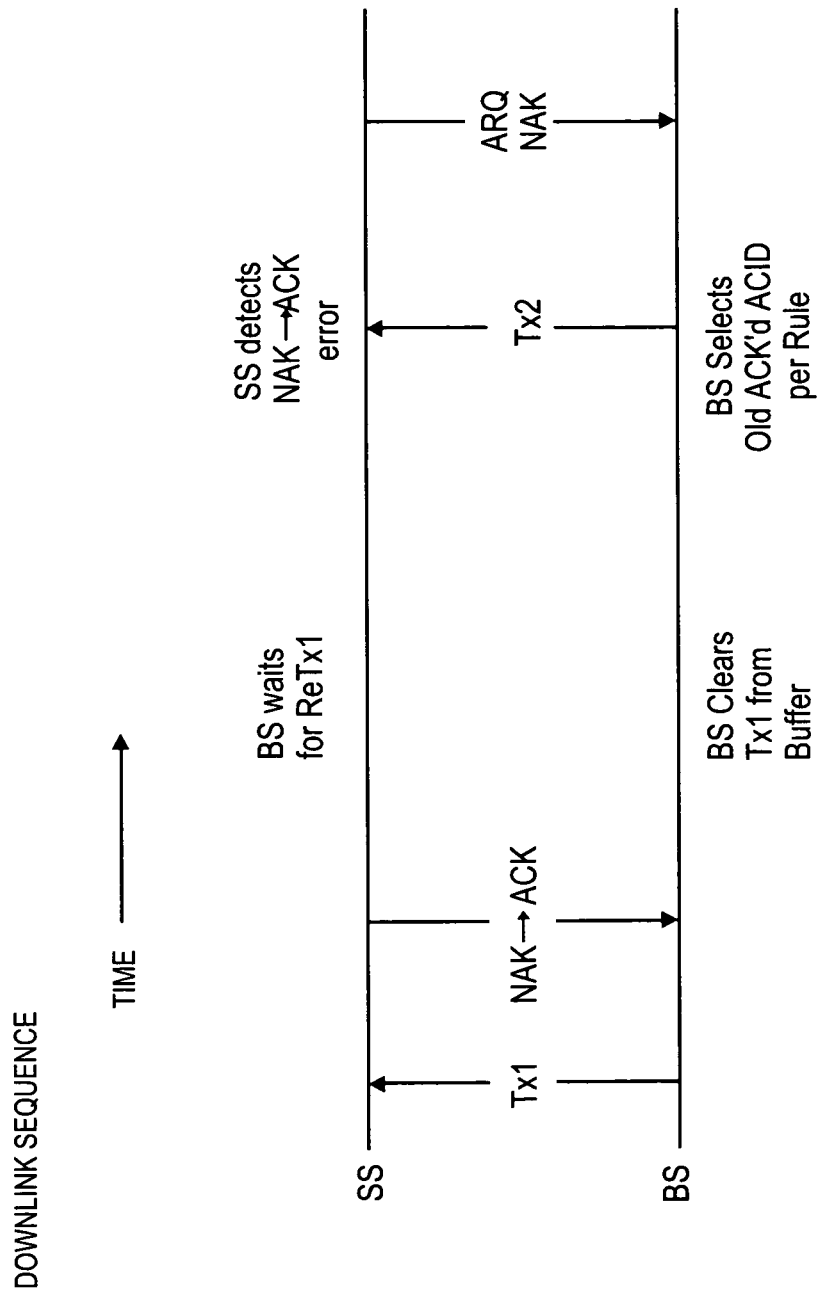
FIGS. 3, 4, 5 and 6 show different scenarios for detection of an incorrectly received ACK, according to various embodiments of the invention.

FIG. 3 assumes the BS now has new data to transmit to the SS, and this new data is indicated as Tx2. To select one of the available ACIDs for the transmission of Tx2, the BS may use certain rules, examples of which were previously described for FIG. 1. The BS may then place the selected ACID into Tx2, along with a value for AI_SN that indicates this is a new transmission rather than a retransmission. When Tx2 is transmitted by the BS and received by the SS, the use of this particular ACID in a new transmission allows the SS to determine that its previous NAK (associated with the same ACID) must have been received by the BS as an ACK, because if it were received correctly as a NAK, this ACID would only be used now in a retransmission. The SS may then have its MAC level initiate an ARQ NAK for transmission back to the BS, thereby notifying the BS that the earlier Tx1 was not received correctly and needs to be retransmitted.

Figure 4:
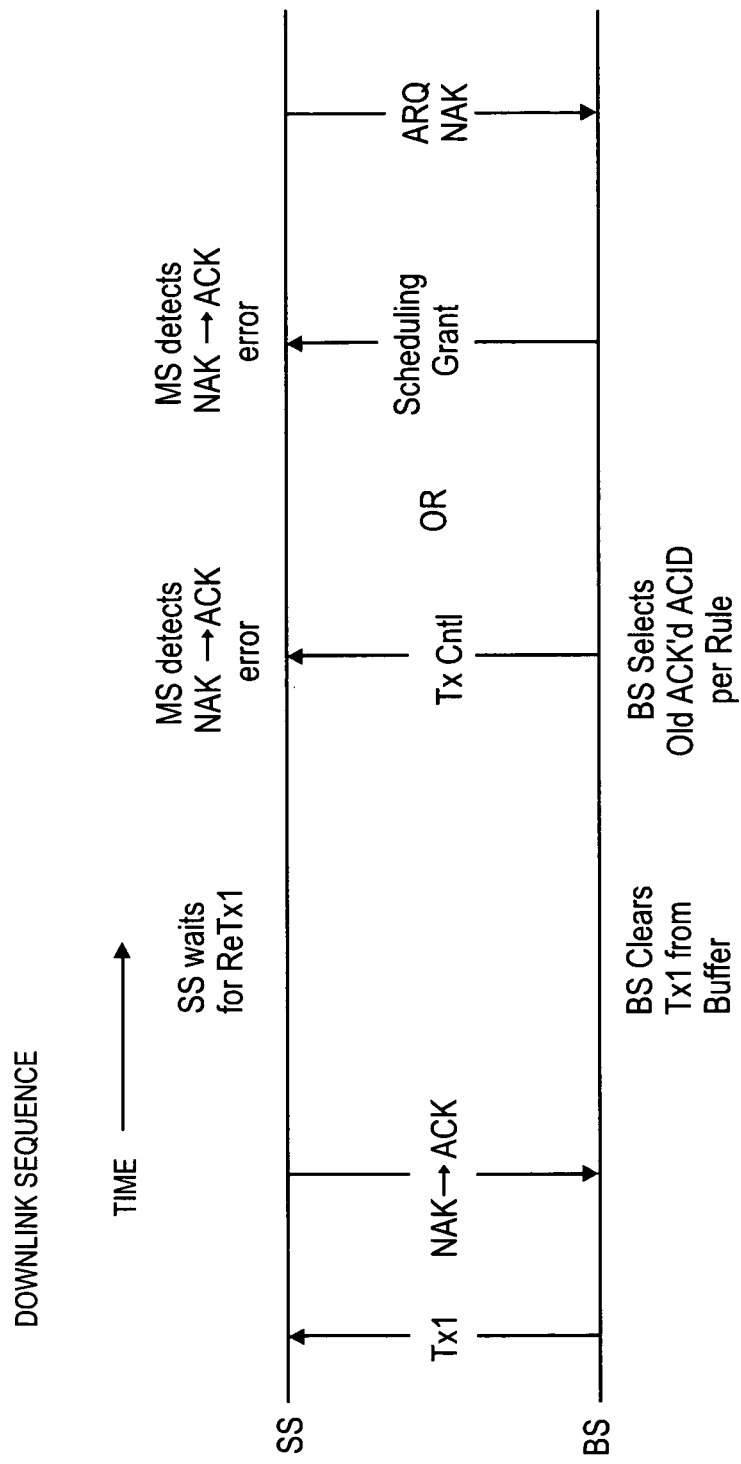

FIG. 4 is similar to FIG. 3, but assumes that after transmitting TX1, the BS has no more data to send to the SS. Since the methods described here require some form of additional transmission so that the SS can compare the ACID in the new transmission with the NAK'd ACID for a previous transmission, two other forms of additional transmission are shown in FIG. 4. In one embodiment, a MAC layer Control message may be transmitted from the BS to the SS. MAC Control messages are ordinarily used as part of the overall network management procedures. In another embodiment, a Scheduling Grant may be transmitted to the SS to schedule the time/channels for the SS to use in a subsequent communication. As long as the same rules as before are used for selecting the ACID for this MAC Control message or this Scheduling Grant, the SS may use the same analysis to determine whether receiving this ACID in a new transmission indicates that the previous NAK was incorrectly received by the BS as an ACK. Note: as used in this document, the term "new transmission" refers to any transmission between this BS-SS pair that is not a retransmission of a previously NAK'd transmission, regardless of whether the new transmission is made for the purpose of communicating data, performing management functions, scheduling future communications, etc.

Figure 5:
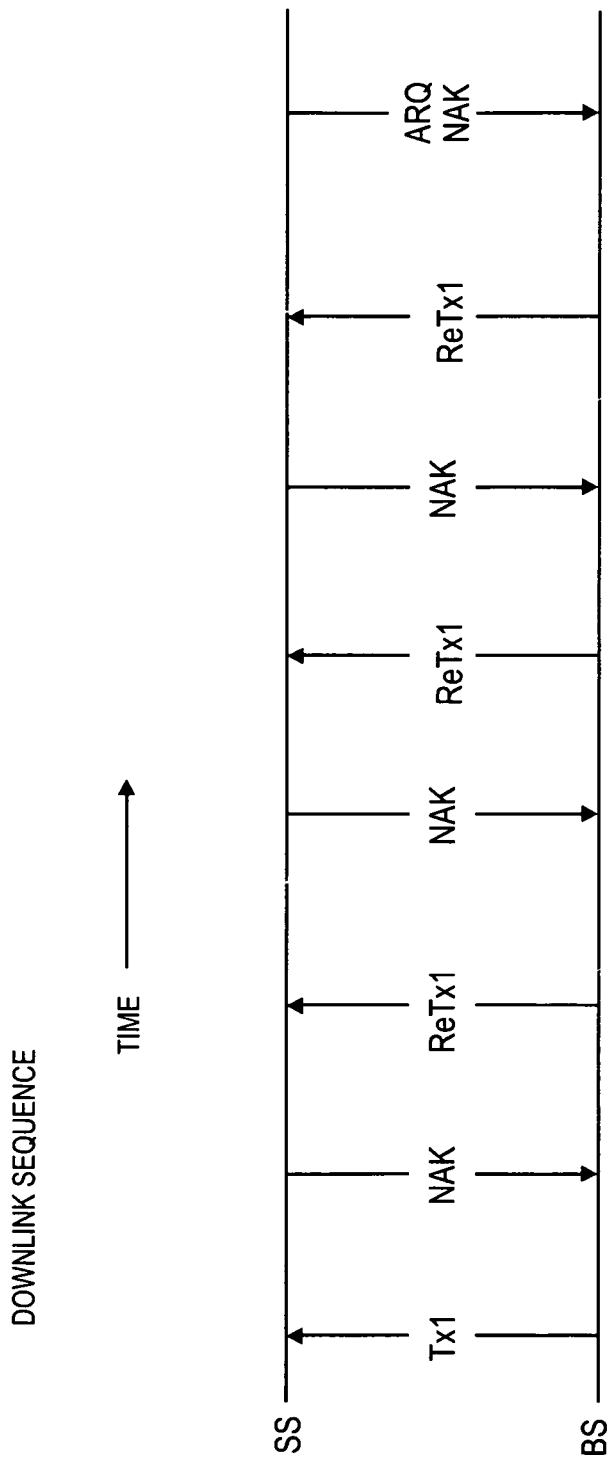

FIG. 5 assumes that the NAKs from the SS are correctly received by the BS, but none of the transmission or retransmissions from the BS are correctly received by the SS. In this situation, a limited number of retransmissions may be permitted for this particular transmission Tx1. Once that number of retransmissions is reached, the SS may initiate an ARQ NAK at the MAC level, regardless of whether the last NAK was in error or not.

Figure 6:
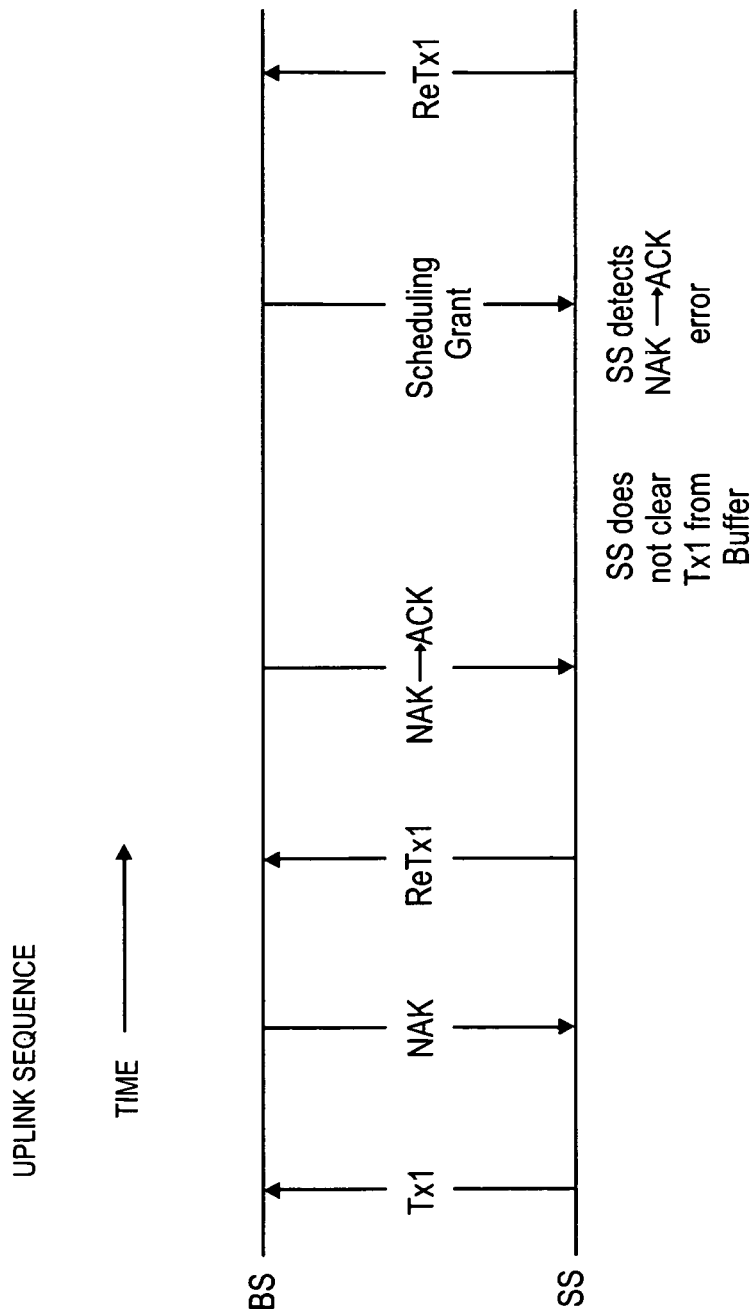

FIG. 6 shows an uplink sequence, in which the SS makes the initial transmission Tx1, and the BS responds with an ACK or NAK. Although the BS/SS roles are reversed from FIG. 3, the same corruption of a HARQ NAK to a HARQ ACK can occur. In this embodiment, when the SS receives an ACK, it does not retransmit Tx1. If the ACK was actually a NAK that was incorrectly received as an ACK, then the BS will be waiting for a retransmission that the SS does not intend to send. Since the BS schedules both downlink and uplink transmissions, the BS can schedule the retransmission through a Scheduling Grant. When the SS receives this Scheduling Grant for the retransmission of Tx1 that it did not intend to send, the SS determines that the ACK it received for Tx1 was received in error, and it can retransmit Tx1 (or the first attempt with ReTx1) as ReTx1. If the SS did not clear Tx1 from its buffer when it erroneously received the ACK (as shown), this facilitates retransmission of Tx1 at the PHY level, thus streamlining the process.

Figure 7:
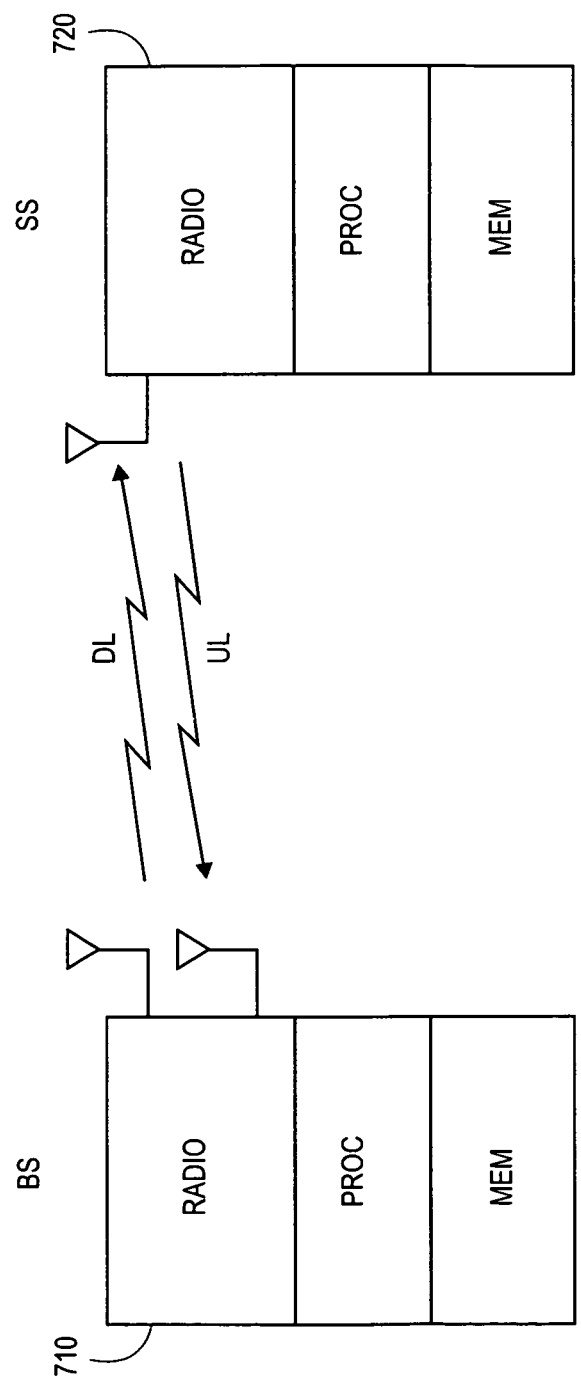
FIG. 7 shows a block diagram of a base station and an associated subscriber station, according to an embodiment of the invention.

FIG. 7 shows a block diagram of a base station and an associated subscriber station, according to an embodiment of the invention. The base station BS and the subscriber station SS each comprise a processor (PROC), a memory (MEM), and a radio (RADIO). The BS 710 is shown with two antennas, while the SS 720 is shown with a single antenna, but either device may have one or any feasible quantity of multiple antennas. Both uplink and downlink data may be wirelessly communicated between the two devices. Although the same labels PROC, MEM, and RADIO are used in each device, this does not imply that one device has an identical processor, memory, or radio as the other device.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
identifying, by a first wireless communications device, a group of Hybrid Automatic Repeat Request (HARQ) Channel IDs (ACIDs) whose previous use by the first wireless communications device was in a transmission that resulted in an ACK being received;
selecting, by the first wireless communications device, a first ACID from the group of ACIDs based on an indication that a first ACK associated with the first ACID had a likelihood of error; and
transmitting a first transmission to the second wireless communications device, the first transmission containing the first ACID and a HARQ Sequence Number (AI_SN) indicating a new transmission.

2. The method of claim 1, wherein the indication comprises a low signal-to-noise ratio for the first ACK.

3. The method of claim 1, wherein the indication comprises a low signal level for the first ACK.

4. The method of claim 1, further comprising:
receiving, after transmitting the first transmission, a NAK for a previous transmission; and
retransmitting the previous transmission;
wherein the NAK is associated with the first ACID and conforms to Automatic Repeat Request protocols.

5. The method of claim 1, wherein the new transmission includes new data.

6. An apparatus, comprising:
a first communications device for a wireless communications network, the first communications device comprising a processor, a memory, and a radio, the first communications device to:
identify a group of Hybrid Automatic Repeat Request (HARQ) Channel IDs (ACIDS) whose previous use by the first communications device was in a transmission that resulted in an ACK being received;
select a first ACID from the group of ACIDs based on an indication that a first ACK associated with the first ACID had a likelihood of error; and
transmit a first transmission to the second communications device, the first transmission containing the first ACID and a HARQ Sequence Number (AI_SN) indicating a new transmission.

7. The apparatus of claim 6, wherein the indication comprises a low signal-to-noise ratio for the first ACK.

8. The apparatus of claim 6, wherein the indication comprises a low signal level for the first ACK.

9. The apparatus of claim 6, wherein the first communications device is to:
receive, after transmitting the first transmission, a NAK for a previous transmission; and
retransmit the previous transmission;
wherein the NAK is associated with the first ACID and conforms to Automatic Repeat Request protocols.

10. An article comprising
a tangible non-transitory computer-readable medium that contains instructions, which when executed by one or more processors result in a first wireless communications device performing operations comprising:
identifying a group of Hybrid Automatic Repeat Request (HARQ) Channel IDs (ACIDs) whose previous use by the first wireless communications device was in a transmission that resulted in an ACK being received;
selecting a first ACID from the group of ACIDs based on an indication that a first ACK associated with the first ACID had a likelihood of error; and
transmitting a first transmission to the second wireless communications device, the first transmission containing the first ACID and a HARQ Sequence Number (AI_SN) indicating a new transmission.

11. The article of claim 10, wherein the indication comprises a low signal-to-noise ratio for the first ACK.

12. The article of claim 10, wherein the indication comprises a low signal level for the first ACK.

13. The article of claim 10, wherein the operations further comprise:
receiving, after transmitting the first transmission, a NAK for a previous transmission; and
retransmitting the previous transmission;
wherein the NAK is associated with the first ACID and conforms to Automatic Repeat Request protocols.

* * * * *